(12) United States Patent
Pfadler et al.

(10) Patent No.: US 11,751,029 B2
(45) Date of Patent: Sep. 5, 2023

(54) VEHICLE, APPARATUS, METHOD, AND COMPUTER PROGRAM FOR A VEHICLE IN A MOBILE COMMUNICATION SYSTEM

(71) Applicant: VOLKSWAGEN AKTIENGESELLSCHAFT, Wolfsburg (DE)

(72) Inventors: Andreas Pfadler, Berlin (DE); Steffen Schmitz, Wesel (DE); Andreas Kwoczek, Lehre (DE)

(73) Assignee: Volkswagen Aktiengesellschaft

( * ) Notice: Subject to any disclaimer, the term of this patent is extended or adjusted under 35 U.S.C. 154(b) by 4 days.

(21) Appl. No.: 17/435,546

(22) PCT Filed: Feb. 26, 2020

(86) PCT No.: PCT/EP2020/055048
§ 371 (c)(1),
(2) Date: Sep. 1, 2021

(87) PCT Pub. No.: WO2020/178104
PCT Pub. Date: Sep. 10, 2020

(65) Prior Publication Data
US 2022/0150677 A1    May 12, 2022

(30) Foreign Application Priority Data

Mar. 7, 2019   (EP) .................................... 19161436

(51) Int. Cl.
*H04W 4/46* (2018.01)
*H04B 7/06* (2006.01)
(Continued)

(52) U.S. Cl.
CPC ............ *H04W 4/46* (2018.02); *H04B 7/0617* (2013.01); *H04W 8/005* (2013.01); *H04W 72/51* (2023.01)

(58) Field of Classification Search
CPC ..... H04W 4/46; H04W 8/005; H04W 72/048; H04W 84/18; H04W 92/16; H04B 7/0617; H04L 5/0053
(Continued)

(56) References Cited

U.S. PATENT DOCUMENTS 11,044,590 B2 *  6/2021  El Assaad ............ H04B 7/0617
2018/0366838 A1  12/2018  Kim et al.
(Continued)

FOREIGN PATENT DOCUMENTS

EP           3089513 A1    11/2016
WO        2015171248 A1    11/2015
(Continued)

OTHER PUBLICATIONS

Shepard et al.; Control Channel Design for Many-Antenna MU-MIMO; MobiCom '15; Sep. 7-11, 2015; Paris France.
(Continued)

*Primary Examiner* — Hirdepal Singh
(74) *Attorney, Agent, or Firm* — BARNES & THORNBURG, LLP (57) ABSTRACT

A transportation vehicle, an apparatus, a method, and a computer program for a transportation vehicle in a mobile communication system a system. A method for a first transportation vehicle in a mobile communication system for setting up data communication with a second transportation vehicle includes receiving a message from the second transportation vehicle on a first radio frequency, the message having information related to an antenna of the second transportation vehicle; configuring an antenna of the first transportation vehicle based on the information related to the antenna of the second transportation vehicle; and transmitting a data packet to the second transportation vehicle on a second radio frequency using the antenna of the first transportation vehicle.

24 Claims, 4 Drawing Sheets

(51) Int. Cl.
*H04W 8/00* (2009.01)
*H04W 72/51* (2023.01)

(58) Field of Classification Search
USPC .......................................... 455/450
See application file for complete search history.

(56) References Cited

U.S. PATENT DOCUMENTS

2020/0059425 A1\* 2/2020 Terechko ............. G05D 1/0088
2020/0280827 A1\* 9/2020 Fechtel ................ H04W 80/02
2022/0039080 A1\* 2/2022 Khoryaev ............... H04W 4/40

FOREIGN PATENT DOCUMENTS

| WO | 2018064179 A1 | 4/2018 |
| WO | 2018199957 A1 | 11/2018 |
| WO | 2019036578 A1 | 2/2019 |

OTHER PUBLICATIONS

Search Report for European Patent Application No. 19161436.1; dated Sep. 3, 2019.
Search Report for International Patent Application No. PCT/EP2020/055048; dated Jun. 2, 2020.
Office Action; European Patent Application No. 19161436.1; dated Mar. 10, 2023.

\* cited by examiner

VEHICLE, APPARATUS, METHOD, AND COMPUTER PROGRAM FOR A VEHICLE IN A MOBILE COMMUNICATION SYSTEM

PRIORITY CLAIM

This patent application is a U.S. National Phase of International Patent Application No. PCT/EP2020/055048, filed 26 Feb. 2020, which claims priority to European Patent Application No. 19161436.1, filed 7 Mar. 2019, the disclosures of which are incorporated herein by reference in their entireties.

SUMMARY

Illustrative embodiments relate to a transportation vehicle, an apparatus, a method, and a computer program for a transportation vehicle in a mobile communication system, more particularly, but not exclusively, to a concept for setting up a high frequency communication link between transportation vehicles.

BRIEF DESCRIPTION OF THE DRAWINGS

Disclosed embodiments are described with reference to the accompanying figures, in which.

DETAILED DESCRIPTION

WO 2015/171248 A1 discloses a concept for establishing a communication link between user equipment and a connection point using low-frequency and high-frequency channels. The low frequency channel is used to provide information based on which a high-frequency channel can be received. Clayton Shepard et al, "Control Channel Design for Many-Antenna MU-MIMO", Rice University 2015, disclose a control channel design for a multi-user beamforming scenario. Document EP 3 089 513 A1 describes a concept in which based on a mobility of a mobile transceiver a radio channel condition is predicted. The future radio channel condition serves as a basis for planning future assignments to base station transceivers.

Conventional concepts consider the coexistence of multiple access technologies or access frequencies. Infrastructure of mobile communication systems can be used to communicate information on the availability of other radio access technologies or access frequencies.

There is a demand for an improved concept for setting up inter-vehicular communication at higher frequencies.

Disclosed embodiments are based on the finding that direct communication between transportation vehicles at higher frequencies may require antenna adaption on both sides of the communication, at the transmitter and at the receiver. As the pathloss at higher frequencies is also high a communication without enhanced antenna gain might not be possible, particularly, with moving transmitter and receiver. It is a finding that lower-frequency inter vehicular communication can be used to exchange information about antenna locations at the transmitter and receiver. Directional antennas can then be configured based on the information and a communication link can be established at the higher-frequency.

Disclosed embodiments provide a method for a first transportation vehicle in a mobile communication system for setting up data communication with a second transportation vehicle. The method comprises receiving a message from the second transportation vehicle on a first radio frequency. The message comprises information related to an antenna of the second transportation vehicle. The method further comprises configuring an antenna of the first transportation vehicle based on the information related to the antenna of the second transportation vehicle. The method further comprises transmitting a data packet to the second transportation vehicle on a second radio frequency using the antenna of the first transportation vehicle. Disclosed embodiments enable using a first radio frequency to exchange information that allows transmitting a data packet from a first transportation vehicle to a second transportation vehicle using a second radio frequency.

The method may further comprise receiving a data packet on the second radio frequency using the antenna of the first transportation vehicle. Disclosed embodiments may establish a communication link between the two transportation vehicles.

For example, the information related to the antenna of the second transportation vehicle comprises information related to a location of the antenna of the second transportation vehicle or information related to a location of the second transportation vehicle and information related to a location or position of the antenna on the second transportation vehicle. With the location information of the antenna of the second transportation vehicle, the first transportation vehicle may configure its antenna so to evoke a certain signal quality (e.g., reception power, signal-to-noise ratio, signal-to-interference-and-noise-ratio, etc.) at the antenna of the second transportation vehicle.

In some exemplary embodiments the method further comprises determining information related to a location of the first transportation vehicle and the configuring is further based on the information related to the location of the first transportation vehicle. For example, once the location of the first transportation vehicle is known, the antenna of the first transportation vehicle can be configured based on the location information of the first transportation vehicle and based on the information related to the antenna of the second transportation vehicle.

The method may further comprise determining a location of the antenna of the first transportation vehicle based on the information related to the location of the first transportation vehicle. The configuring may be based on the location of the antenna on the first transportation vehicle relative to the location of the antenna of the second transportation vehicle. Some exemplary embodiments may configure the first antenna to evoke a high signal quality at the location of the antenna of the second transportation vehicle based on the two antenna locations and positions.

The receiving of the message uses a static, e.g., omnidirectional, antenna characteristic. Disclosed embodiments may enable to use less advanced antenna concepts for receiving the message on the first radio frequency.

For example, the antenna of the first transportation vehicle is a directional antenna and the configuring comprises directing a main lobe of the directional antenna towards the antenna of the second transportation vehicle. Disclosed embodiments may hence enable to provide information based on which a beam of a directional antenna can be oriented on the first radio frequency. For instance, the directional antenna is a beamforming antenna and the configuring comprises setting beamforming weights for the beamforming antenna. Disclosed embodiments may enable to configure a beamforming antenna based on the message received on the first radio frequency.

In further exemplary embodiments, the method comprises transmitting another message to the second transportation vehicle on the first radio frequency. The message comprises information related to the antenna of the first transportation vehicle. Disclosed embodiments may enable antenna configurations for the second radio frequency at both transportation vehicles. The other message may comprise information related to a location of the antenna of the first transportation vehicle to enable the second transportation vehicle to point an antenna beam towards the antenna of the first transportation vehicle. Mutual beamforming may be enabled in some exemplary embodiments.

For example, the second radio frequency may be above 6 GHz. The message received on the first radio frequency may be a cooperative awareness message, which may be a broadcast, multicast or groupcast message. Such a message may be transmitted at 5.9 GHz, for example. Disclosed embodiments may enable utilization of car-to-car messages to establish high-frequency communication links with directional antennas.

In some exemplary embodiments the message received on the first radio frequency is received using a control channel controlling communication on the second radio frequency. Disclosed embodiments may enable to use the first radio frequency at least for a part of a control plane and the second radio frequency for a user plane of a communication link.

Disclosed embodiments further provide an apparatus for a transportation vehicle in a mobile communication system. The apparatus comprises one or more interfaces, which are configured to communicate in the mobile communication system. The apparatus further comprises a control module, which is configured to control the one or more interfaces. The control module is further configured to perform one of the methods described herein. Another exemplary embodiment is a transportation vehicle comprising the apparatus.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
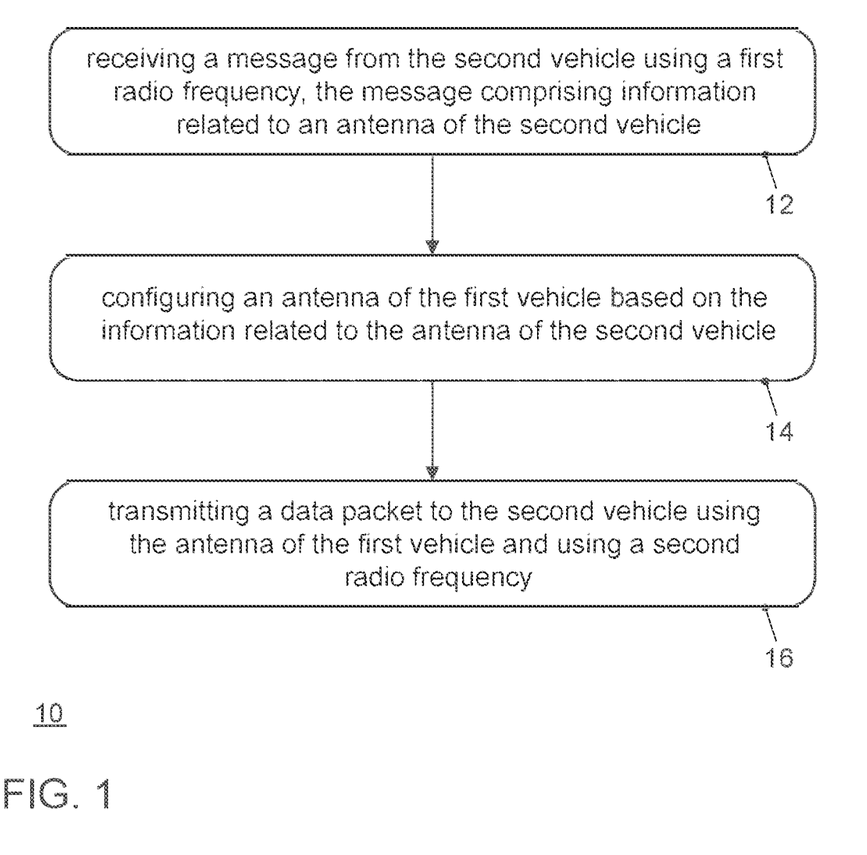
FIG. 1 illustrates a block diagram of an exemplary embodiment of a method for a transportation vehicle.

FIG. 1 shows a block diagram of an exemplary embodiment of a method 10 for a first transportation vehicle in a mobile communication system for setting up data communication with a second transportation vehicle. The method 10 comprises receiving 12 a message from the second transportation vehicle on a first radio frequency. The message comprises information related to an antenna of the second transportation vehicle. The method 10 further comprises configuring 14 an antenna of the first transportation vehicle based on the information related to the antenna of the second transportation vehicle and transmitting 16 a data packet to the second transportation vehicle on a second radio frequency using the antenna of the first transportation vehicle.

Figure 2:
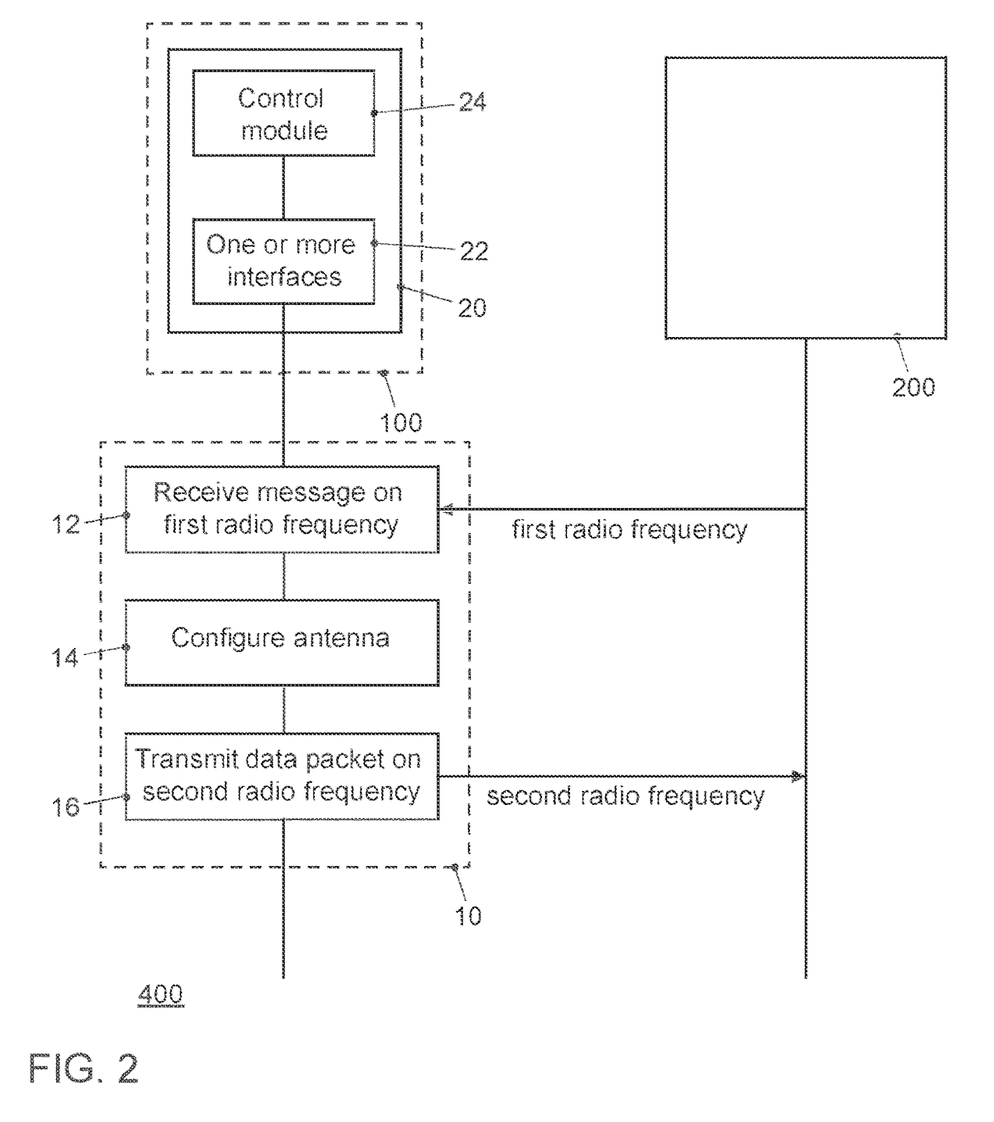
FIG. 2 illustrates a block diagram of an exemplary embodiment of an apparatus and exemplary embodiments of transportation vehicles.

FIG. 2 illustrates block diagrams of an exemplary embodiment of an apparatus 20 and exemplary embodiments of transportation vehicles 100, 200. The apparatus 20 for the first transportation vehicle 100 comprises one or more interfaces 22 configured to communicate in the mobile communication system 400. The apparatus 20 further comprises a control module 24, which is coupled to the one or more interfaces 22 and which is configured to control the one or more interfaces 22. The control module 24 is further configured to perform one of the methods 10 as described herein. FIG. 2 further illustrates an exemplary embodiment of a second transportation vehicle, which also comprises an exemplary embodiment of the apparatus 20. As will be described in the following, transportation vehicle 100 may carry out the method 10. FIG. 2 further illustrates an exemplary embodiment of a mobile communication system 400.

In exemplary embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information related to capabilities, application requirements, trigger indications, requests, messages, data packets, acknowledgement packets/messages, etc.

As shown in FIG. 2 the one or more interfaces 22 are coupled to the control modules 24 at the apparatus 20. In exemplary embodiments the control module 24 may be implemented using one or more processing units, one or more processing devices, any method or mechanism for processing, such as a processor, a computer or a programmable hardware component being operable with accordingly adapted software. In other words, the described functions of the control modules 24 may as well be implemented in a software, which is then executed on one or more programmable hardware components. Such hardware components may comprise a general purpose processor, a Digital Signal Processor (DSP), a micro-controller, etc.

FIG. 2 also shows an exemplary embodiment of a system 400 comprising disclosed embodiments of the transportation vehicles 100, 200. In exemplary embodiments, communication, i.e., transmission, reception or both, may take place among transportation vehicles 100, 200 directly and/or between mobile transceivers/vehicles 100, 200 and a network component (infrastructure or mobile transceiver, e.g., a base station, a network server, a backend server, etc.). Such communication may make use of a mobile communication system 400. Such communication may be carried out directly, e.g., by using a device-to-device (D2D) communication, which may also comprise vehicle-to-vehicle (V2V) or car-to-car communication in case of transportation vehicles 100, 200. Such communication may be carried out using the specifications of a mobile communication system 400.

In exemplary embodiments the one or more interfaces 22 can be configured to wirelessly communicate in the mobile communication system 400. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE.

FIG. 2 also illustrates the method 10 as described above. Transportation vehicle 100 receives 12 a message from the second transportation vehicle 200 using a first radio frequency. The message comprises information related to an antenna of the second transportation vehicle 200. Transportation vehicle 100 then configures 14 an antenna of the first transportation vehicle 100 based on the information related to the antenna of the second transportation vehicle 200. Transportation vehicle 100 then transmits 16 a data packet to the second transportation vehicle 200 using the configured antenna of the first transportation vehicle 100 and using a second radio frequency.

The mobile communication system 400, as shown in FIG. 2, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio (NR)) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs. A base station transceiver can be operable or configured to communicate with one or more active mobile transceivers/vehicles 100, 200 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/vehicles 100, 200 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver/vehicle 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Transportation vehicles 100, 200 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, DSRC, respectively. Technologies enabling such D2D-communication include 802.11p, 3GPP system (4G, 5G, NR and beyond), etc.

For example, the transportation vehicles 100, 200 set up a communication link at the second radio frequency, which is in a mmWave-band, e.g., at a frequency above 5 or 6 GHz such as 30-300 GHz, ITS bands (Intelligent Transportation Systems), 27-28 GHz, 3GPP FR1 and FR2 (Frequency Range), etc. In this frequency range free space pathloss is critical (free space pathloss grows in a quadratic manner relative to frequency). At the same time, antenna dimensions can be decreased with the decreasing wavelength and more antenna elements can be fit in a limited area. A higher number of antenna elements can be used for higher order beamforming to generate higher antenna/beamforming gains. For example, so called pencil beams can be generated, which are narrow antenna beams with high gain. Such beamforming can be achieved using antenna elements in a defined geometric pattern, where the signal phase of each individual antenna element signal is varied in a way, that for certain directions constructive and for other directions destructive superposition of the antenna element signals is achieved. The phase variations can be applied in the base band or in the transmission band, using analog or digital signal processing. In general, directional (high gain) antennas may be used in exemplary embodiments, where beamforming is one option to implement a high gain antenna, be it digital, analog, or both. Depending on the operating frequency a line-of-sight radio channel (direct propagation path between transmit and receive antennas) may be necessary to establish a communication/radio link. Respective antenna beams may then directly point to each other.

Optionally a gimbal may be used to install one or more directional antennas at the transportation vehicle. The antenna may then be steered of pointed based on the message with the information on the antenna of the other transportation vehicle using actuators to adjust the antenna in the gimbal.

It is noted that in some exemplary embodiments optimal beams might not be pencil beams and they might not point directly to each other. To provide an optimal quality on the communication/radio link, the receive power from a desired transmitter might not be the only criterion. Interference from others might be just as important. For example, a signal-to-interference-and-noise ratio may be an optimization criterion. In this case it might be more desirable to attenuate an interferer than to maximize a reception power from a desired transmitter. In such a scenario an interferer may even be spatially cancelled (also referred to as spatial nulling) by using destructive signal superposition for a direction of the interferer. The beam formed in such a scenario might not be a pencil beam (maximum antenna gain in one direction) but may be of an arbitrary shape, particularly, if multiple spatial nulls are used to suppress multiple interferers.

As has been mentioned above, disclosed embodiments may make use of beamforming, which is to be understood as signal processing method or mechanism to achieve defined or controlled superposition of the signals transmitted/received by the individual transmit/receive antenna elements. For example, a geometry of a plurality of transmit/receive antenna elements may correspond to a linear antenna array, a circular antenna array, a triangular antenna array, any two-dimensional antenna array or field, or even an arbitrary antenna array, for as long as geometrical relations between the antenna elements are known or controlled. In some exemplary embodiments, the plurality of antenna elements or transmit/receive antenna elements may correspond to a uniform linear antenna array, wherein the transmit/receive antenna elements are spaced uniformly, and the distance between to antenna elements may correspond to, for example, half of a wavelength of the carrier frequency of the signals transmitted/received using these antenna elements. As known for beamforming, by providing phase shifted versions of the same signal to different antenna elements, constructive and destructive superposition of the transmitted signals may be achieved for different angular directions with respect to these antennas. The more antennas are used, the higher the overall beamforming gain and the narrower a beam that may be formed. In exemplary embodiments a transmit/receive antenna or a transmit/receive antenna element may use an individual beam pattern. For example, a transportation vehicle may operate multiple antenna arrays, e.g., one in the front and one in the rear/back of the transportation vehicle. The individual antenna elements used in an array may already have a directional beam pattern. Typical half-power beam widths for such elements may be 150°, 120°, 90°, 60°, etc. The individual elements may point away from the transportation vehicle, i.e., a front element may point to the front and a rear element may point to the back.

For example, the control module 24 may control a beam switching matrix from which several predefined beams may be selected. A Butler-matrix or other hardware implemented solutions may be used to form the beams. Such a hardware-beamformer may allow the control module 24 selecting one out of a plurality of predefined beams. For example, 32, 64, 128, 256, 512, or 1024 may be predefined to select from.

Figure 3:
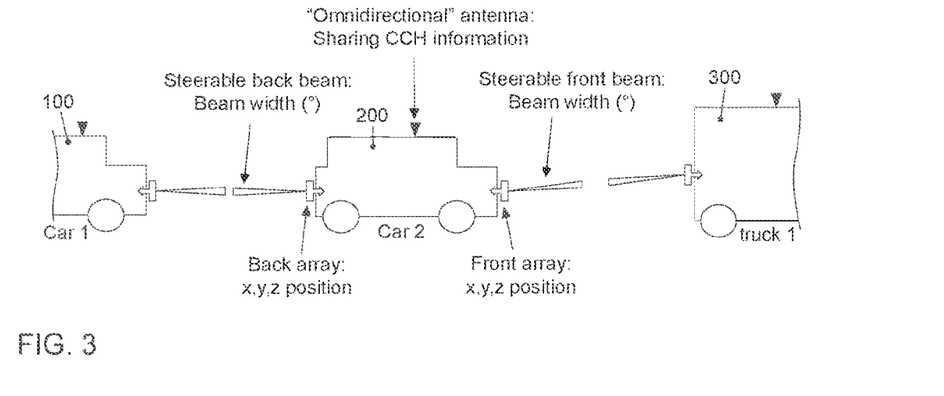
FIG. 3 illustrates an inter-vehicle communication scenario.

FIG. 3 illustrates an inter-vehicle communication scenario in an exemplary embodiment. FIG. 3 shows a transportation vehicle 200 (e.g., a car) in the center driving from the left to the right. There is another transportation vehicle 300 in front (e.g., a truck), and yet another transportation vehicle 100 (another car) behind. The transportation vehicles are assumed to operate directional antenna high antennas for the second radio frequency. Such directional antennas may be implemented by antenna arrays, e.g., defined geometrical arrangements of a plurality of antenna elements.

Transportation vehicle 200 has multiple antennas, there is one beamforming antenna in the front and another beamforming antenna in the back, the same assumption holds for the other transportation vehicles 100, 300. On the roof top of transportation vehicle 200 there is another omnidirectional antenna. In the exemplary embodiment depicted in FIG. 3 the object of transportation vehicle 200 is to form a beam in front (steerable front beam, with a certain width), which points towards another beamforming antenna in the back of transportation vehicle 300 to establish a communication link with transportation vehicle 300. Likewise, it is an object of transportation vehicle 200 to form a beam in the back (steerable back beam, with a certain width), which points towards the front antenna of transportation vehicle 100.

Moreover, in the present exemplary embodiment, it is assumed that the first radio frequency is lower than the second radio frequency, for example, the first radio frequency is in an LTE band at around 2.1 GHz (sidelink, PC5 communication) and the second radio frequency is in a 5G 30 GHz band. In this exemplary embodiment different radio access technologies are used, LTE and 5G. In other disclosed embodiments the same access technology may be used at different frequencies, e.g., in a scenario using carrier aggregation.

In the exemplary embodiment shown in FIG. 3 it is assumed that the communication links on the second frequency are configured to transmit and receive data packets. Transportation vehicles 100, 200, 300 may transmit and receive data packets on the second radio frequency. For this communication, transportation vehicles 100, 200, 300 use the beamforming antennas.

Moreover, it is assumed that the message on the first radio frequency is received using a static antenna characteristic, e.g., an omnidirectional dipole antenna may be used. Via the first radio frequency control channel information is shared. Hence, the message received on the first radio frequency may be received using a control channel controlling communication on the second radio frequency. Such a control channel may have been established before or even with the message. For example, the shared information may be a cooperative awareness message (CAM). This message may be transmitted as part of car-to-car or vehicle-to-vehicle communication. For example, traffic and status information may be exchanged using this message in a broadcast, multicast, groupcast, or unicast state.

For example, the message is received at the first transportation vehicle 100 from the second transportation vehicle 200. The information related to the antenna of the second transportation vehicle 200 comprises information related to a location of the antenna of the second transportation vehicle 200, information related to a location of the second transportation vehicle 200 and information related to a location or position of the antenna on the second transportation vehicle 200, respectively. In some exemplary embodiments, transportation vehicles 100, 200, 300 are equipped with high precession localization GPS (Global Positioning System). Therefore, the x, y, z positions of the back array of transportation vehicle 200 may be received by transportation vehicle 100 via the omnidirectional CCH antenna and the front array position of transportation vehicle 100 can be received by transportation vehicle 200.

Transportation vehicle 100 further uses its own GPS receiver to determine information related to its own location. The configuring of the front beamforming antenna of transportation vehicle 100 can then be further based on the information related to its own location. For example, transportation vehicle 100 determines (information related to) a location of its front beamforming antenna based on the information related to its location. The configuring 14 may then be based on the location of the beamforming front antenna on the first transportation vehicle 100 relative to the back or rear beamforming antenna of the second transportation vehicle 200. The configuring 14 may comprise directing a main lobe of the directional antenna towards the antenna of the second transportation vehicle 200. In some exemplary embodiments this may be done by setting beamforming weights for the beamforming antenna so to form a beam pointing to the corresponding antenna as indicated in FIG. 3.

To set up both beamforming antennas on both sides, transportation vehicle 100 may transmit an according message to the second transportation vehicle 200 using the first or second radio frequency. This message comprises information related to the antenna of the first transportation vehicle 100. For example, information related to the location of the antenna of the first transportation vehicle 100 is provided to enable the second transportation vehicle 200 to point its antenna beam towards the antenna of the first transportation vehicle 100.

Figure 4:
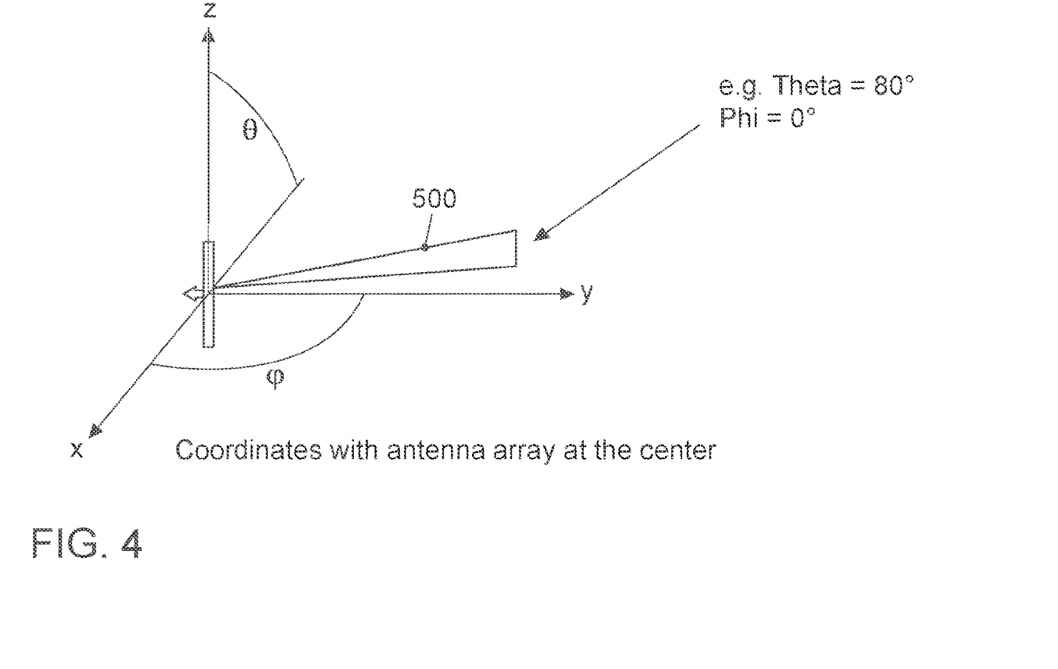
FIG. 4 shows determination of pencil beam angles in an exemplary embodiment.

FIG. 4 shows determination of pencil beam angles in an exemplary embodiment. In FIG. 4, it is assumed that a narrow beam with high antenna gain is formed. FIG. 4 shows a cartesian coordinate system based on coordinate directions x, y, and z. A beam 500 is exemplified, which can be defined by its elevation angle theta and its azimuth angle phi. For example, if two coordinates of a transmitting and a receiving antenna are known, the angles theta and phi can be determined by the spatial vector difference between these positions/locations.

Disclosed embodiments may provide a concept that allows a front beam (of following transportation vehicle) and a back beam (transportation vehicle driving ahead) and vice versa of two transportation vehicles to find each other, to steer their beams towards each other, respectively. This may be achieved by sharing precise geographical position with "omnidirectional" antenna without beamforming, e.g., by CAM messages.

A transportation vehicle may be enabled to determine the position of an antenna of another transportation vehicle and then steer its own beam towards that direction. The transportation vehicles may use a more omnidirectional CAM message at lower frequencies to find the position and/or antenna related information of the antenna array of the respective communication partner and vice versa. For example, the lower frequencies may be used to establish a control channel for the beamforming at the second higher frequency.

As already mentioned, in exemplary embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having a method or mechanism for performing each of the respective operations of these methods.

LIST OF REFERENCE SIGNS 10 method for transportation vehicle
12 receiving a message from the second transportation vehicle using a first radio frequency, the message comprising information related to an antenna of the second transportation vehicle
14 configuring an antenna of the first transportation vehicle based on the information related to the antenna of the second transportation vehicle
16 transmitting a data packet to the second transportation vehicle using the antenna of the first transportation vehicle and using a second radio frequency
20 apparatus for transportation vehicle
22 one or more interface
24 control module
100 transportation vehicle
200 transportation vehicle
300 transportation vehicle
400 mobile communication system
500 beam

The invention claimed is:

1. A method for a first transportation vehicle in a mobile communication system for setting up data communication with a second transportation vehicle, the method comprising:
receiving a message from the second transportation vehicle on a first radio frequency, the message comprising information about an antenna of the second transportation vehicle;
configuring an antenna of the first transportation vehicle based on the information about the antenna of the second transportation vehicle; and transmitting a data packet to the second transportation vehicle on a second radio frequency using the antenna of the first transportation vehicle, wherein the information about the antenna of the second transportation vehicle comprises information related to a location of the antenna of the second transportation vehicle, or information related to a location of the second transportation vehicle and information related to a location or position of the antenna on the second transportation vehicle.

2. The method of claim 1, further comprising receiving a data packet on the second radio frequency using the antenna of the first transportation vehicle.

3. The method of claim 1, further comprising determining information related to a location of the first transportation vehicle and wherein the configuring is further based on the information related to the location of the first transportation vehicle.

4. The method of claim 3, further comprising determining a location of the antenna of the first transportation vehicle based on the information related to the location of the first transportation vehicle, wherein the configuring is based on the location of the antenna on the first transportation vehicle relative to the location of the antenna of the second transportation vehicle.

5. The method of claim 1, wherein receiving of the message is performed based at least in part on a static antenna characteristic.

6. The method of claim 1, wherein the antenna on the first transportation vehicle is a directional antenna and wherein the configuring comprises directing a main lobe of the directional antenna toward the antenna of the second transportation vehicle.

7. The method of claim 6, wherein the directional antenna is a beamforming antenna and wherein the configuring comprises setting beamforming weights for the beamforming antenna.

8. The method of claim 1, further comprising transmitting another message to the second transportation vehicle using the first radio frequency, the message comprising information related to the antenna of the first transportation vehicle.

9. The method of claim 8, wherein the other message comprises information related to a location of the antenna of the first transportation vehicle to enable the second transportation vehicle to point an antenna beam towards the antenna of the first transportation vehicle.

10. The method of claim 1, wherein the second radio frequency is above 6 GHz and/or wherein the message received on the first radio frequency is a cooperative awareness message.

11. The method of claim 1, wherein the message received on the first radio frequency is received using a control channel controlling communication on the second radio frequency.

12. A non-transitory computer readable medium that includes a computer program having a program code for performing the method of claim 1, when the computer program is executed on a computer, a processor, or a programmable hardware component.

13. An apparatus for a transportation vehicle in a mobile communication system, the apparatus comprising
one or more interfaces configured to communicate in the mobile communication system; and
a control module configured to:
control the one or more interfaces, wherein the control module is further configured to control operation of the apparatus to set up data communication with another transportation vehicle via the mobile communication system by controlling receipt of a message from the other transportation vehicle on a first radio frequency, wherein the message comprises information about an antenna of the other transportation vehicle,
control configuration of an antenna of the transportation vehicle based on the information about the antenna of the other transportation vehicle, and
control transmission of a data packet to the other transportation vehicle on a second radio frequency using the antenna of the transportation vehicle,
wherein the information about the antenna of the other transportation vehicle comprises information related to a location of the antenna of the other transportation vehicle, or information related to a location of the other transportation vehicle and information related to a location or position of the antenna on the other transportation vehicle.

14. A transportation vehicle comprising the apparatus of claim 13.

15. The apparatus of claim 13, wherein the control unit further controls the apparatus to receive a data packet on the other radio frequency using the antenna of the transportation vehicle.

16. The apparatus of claim 13, wherein the control unit further controls the apparatus to determine information related to a location of the transportation vehicle and wherein the configuration is further based on the information related to the location of the transportation vehicle.

17. The apparatus of claim 16, wherein the control unit further controls the apparatus to determine a location of the antenna of the transportation vehicle based on the information related to the location of the transportation vehicle, wherein the configuration is based on the location of the antenna on the transportation vehicle relative to the location of the antenna of the other transportation vehicle.

18. The apparatus of claim 13, wherein receipt of the message is performed based at least in part on a static antenna characteristic.

19. The apparatus of claim 13, wherein the antenna on the transportation vehicle is a directional antenna and wherein the configuration comprises directing a main lobe of the directional antenna toward the antenna of the other transportation vehicle.

20. The apparatus of claim 19, wherein the directional antenna is a beamforming antenna and wherein the configuration comprises setting beamforming weights for the beamforming antenna.

21. The apparatus of claim 13, wherein the control unit further controls the apparatus to transmitting another message to the other transportation vehicle using the radio frequency, the message comprising information related to the antenna of the transportation vehicle.

22. The apparatus of claim 21, wherein the other message comprises information related to a location of the antenna of the transportation vehicle to enable the other transportation vehicle to point an antenna beam towards the antenna of the transportation vehicle.

23. The apparatus of claim 13, wherein the other radio frequency is above 6 GHz and/or wherein the message received on the radio frequency is a cooperative awareness message.

24. The apparatus of claim 13, wherein the message received on the radio frequency is received using a control channel controlling communication on the other radio frequency.

* * * * *